US012581016B2

(12) United States Patent
Mahajan et al.

(10) Patent No.: US 12,581,016 B2
(45) Date of Patent: *Mar. 17, 2026

(54) CONFIRMING ALIGNMENT BETWEEN CONTEMPORANEOUS VISUAL AND AUDIO FEEDBACK OF THE AGENT DURING CUSTOMER CALLS

(71) Applicant: Bank of America Corporation, Charlotte, NC (US)

(72) Inventors: Nipun Mahajan, Lawrenceville, NJ (US); Ayela Chughtai, New York, NY (US); Sushama Shelke, Mumbai (IN); John T. Blackmon, Jacksonville, FL (US); Yogesh Raghuvanshi, Pennington, NJ (US); Amit Mishra, Chennai (IN); Saravana Prakash Kumaresan, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 154 days.

This patent is subject to a terminal disclaimer.

(21) Appl. No.: 18/589,594

(22) Filed: Feb. 28, 2024

(65) Prior Publication Data

US 2025/0272630 A1    Aug. 28, 2025

(51) Int. Cl.
*H04M 3/51* (2006.01)
*G06Q 10/0631* (2023.01)
(Continued)

(52) U.S. Cl.
CPC .. *H04M 3/5175* (2013.01); *G06Q 10/063114* (2013.01); *G06Q 10/063116* (2013.01);
(Continued)

(58) Field of Classification Search
USPC .............................. 382/100, 103; 379/265.06
See application file for complete search history.

(56) References Cited

U.S. PATENT DOCUMENTS

| 11,076,047 B1 * | 7/2021 | Clodore | ............... G06Q 30/016 |
| 2012/0296642 A1 * | 11/2012 | Shammass | .............. G10L 25/63 |
| | | | 704/211 |

(Continued)

OTHER PUBLICATIONS

Wegge, Jürgen, Joachim Vogt, and Christiane Wecking. "Customer-induced stress in call centre work: A comparison of audio-and videoconference." Journal of Occupational & Organizational Psychology 80.4 (2007). (Year: 2007).*

(Continued)

*Primary Examiner* — Gurkanwaljit Singh
(74) *Attorney, Agent, or Firm* — Weiss & Arons LLP

(57) ABSTRACT

A non-transitory computer-readable medium may store instructions readable by a processor for destressing an agent in a contract center. The instructions may cause the processor to run a monitoring and triggering application ("MTA") to identify a state of stress of the agent. The MTA may run an artificial intelligence machine learning ("MTA AI/ML") algorithm to identify the state of stress in which a first data stream feature ("first feature") may have a first emotion of the agent that registers above a first feature threshold that corresponds to the first feature, and a second data stream feature ("second feature") that is contemporaneous with the first feature may have a second emotion of the agent that is aligned with the first emotion of the agent when the first emotion registers above the first feature threshold and the second emotion, contemporaneous with the first emotion, registers above a second feature threshold.

20 Claims, 11 Drawing Sheets

(51) Int. Cl.

| | | |
|---|---|---|
| *G06V 20/40* | (2022.01) | |
| *G06V 40/16* | (2022.01) | |
| *G06V 40/20* | (2022.01) | |
| *G10L 15/02* | (2006.01) | |
| *G10L 15/18* | (2013.01) | |
| *G10L 25/63* | (2013.01) | |

(52) U.S. Cl.
CPC ............ *G06V 20/46* (2022.01); *G06V 40/176* (2022.01); *G06V 40/28* (2022.01); *G10L 15/02* (2013.01); *G10L 15/1815* (2013.01); *G10L 25/63* (2013.01)

(56) References Cited

U.S. PATENT DOCUMENTS

| | | | | |
|---|---|---|---|---|
| 2016/0180277 A1* | 6/2016 | Skiba | .................. | H04M 3/5175 379/265.06 |
| 2017/0103360 A1* | 4/2017 | Ristock | .................. | H04L 67/10 |
| 2017/0104872 A1* | 4/2017 | Ristock | ................. | H04M 3/523 |
| 2019/0158671 A1* | 5/2019 | Feast | ...................... | G06Q 10/10 |
| 2021/0397824 A1* | 12/2021 | Mishra | .............. | G06Q 10/0635 |
| 2022/0292518 A1* | 9/2022 | Kilicoglu | ............ | G06Q 30/015 |
| 2022/0335752 A1* | 10/2022 | Alghamdi | ................ | A61B 5/74 |
| 2025/0106322 A1* | 3/2025 | Sakalkar | ............. | H04M 3/5175 |

OTHER PUBLICATIONS

Plaza, Miroslaw, et al. "Emotion recognition method for call/contact centre systems." Applied Sciences 12.21 (2022): 10951. (Year: 2022).*

Bromuri, Stefano, et al. "Using AI to predict service agent stress from emotion patterns in service interactions." Journal of Service Management 32.4 (2021): 581-611. (Year: 2021).*

Lefter, Iulia, Gertjan J. Burghouts, and Léon JM Rothkrantz. "Recognizing stress using semantics and modulation of speech and gestures." IEEE Transactions on Affective Computing 7.2 (2015): 162-175. (Year: 2015).*

* cited by examiner

200

220

204

I/O

206

PERIPHERAL DEVICES

202

CHIP MODULE

208

PROCESSOR

212

210

MEMORY

500

501

| Expressions/Gestures Detected | Sentiment Detected | Emotion and its Score Detected | Contemporaneous Output |
|---|---|---|---|
| Smiling | 1 (Positive) | Polite (0.8) | 1 |
| Yawning | -1 (Negative) | Frustrated (0.4) | 1 |
| Yawning | -1 (Negative) | Excited (0.9) | 0 |

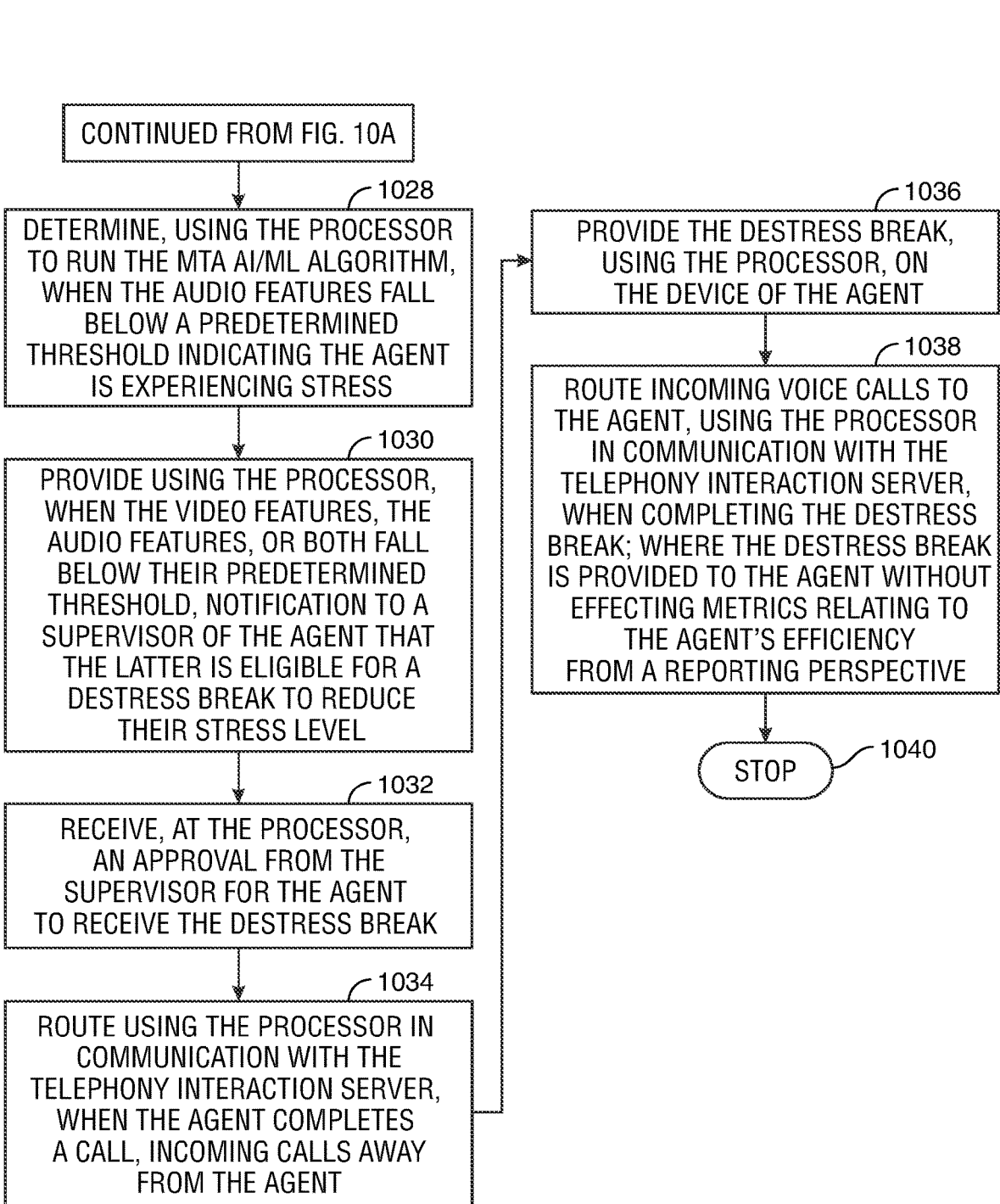

CONTINUED FROM FIG. 10A

1028

DETERMINE, USING THE PROCESSOR TO RUN THE MTA AI/ML ALGORITHM, WHEN THE AUDIO FEATURES FALL BELOW A PREDETERMINED THRESHOLD INDICATING THE AGENT IS EXPERIENCING STRESS

1030

PROVIDE USING THE PROCESSOR, WHEN THE VIDEO FEATURES, THE AUDIO FEATURES, OR BOTH FALL BELOW THEIR PREDETERMINED THRESHOLD, NOTIFICATION TO A SUPERVISOR OF THE AGENT THAT THE LATTER IS ELIGIBLE FOR A DESTRESS BREAK TO REDUCE THEIR STRESS LEVEL

1032

RECEIVE, AT THE PROCESSOR, AN APPROVAL FROM THE SUPERVISOR FOR THE AGENT TO RECEIVE THE DESTRESS BREAK

1034

ROUTE USING THE PROCESSOR IN COMMUNICATION WITH THE TELEPHONY INTERACTION SERVER, WHEN THE AGENT COMPLETES A CALL, INCOMING CALLS AWAY FROM THE AGENT

1036

PROVIDE THE DESTRESS BREAK, USING THE PROCESSOR, ON THE DEVICE OF THE AGENT

1038

ROUTE INCOMING VOICE CALLS TO THE AGENT, USING THE PROCESSOR IN COMMUNICATION WITH THE TELEPHONY INTERACTION SERVER, WHEN COMPLETING THE DESTRESS BREAK; WHERE THE DESTRESS BREAK IS PROVIDED TO THE AGENT WITHOUT EFFECTING METRICS RELATING TO THE AGENT'S EFFICIENCY FROM A REPORTING PERSPECTIVE

STOP          1040

FIG. 10B

CONFIRMING ALIGNMENT BETWEEN CONTEMPORANEOUS VISUAL AND AUDIO FEEDBACK OF THE AGENT DURING CUSTOMER CALLS

FIELD OF TECHNOLOGY

Aspects of the disclosure relate to artificial intelligence machine learning monitoring and triggering application for destressing a contact center agent.

BACKGROUND OF THE DISCLOSURE

Contact center associates, including contact center agents, may have to attend to the customer calls one after the other and resolve customer queries. There may be limited options available for tracking the agent to see if they need a break beyond the number of breaks allotted to them in a typical work schedule.

Agent exhaustion may be an example of a justified cause for providing a break to the agent. There may be several reasons which can lead to agent exhaustion, such as long hours of working or stress caused by specific calls. These reasons and others may cause the agent fatigue and irritation, which may affect the agent's attention, mood, and eventually, the quality of conversation with the customer.

SUMMARY OF THE DISCLOSURE

Agent exhaustion may be addressed by providing the agent with a break to destress.

The method may include a method for destressing an agent in a contact center of an enterprise.

The method may include using a processor to run an application to identify a state of the agent. The state of the agent may include a state of stress.

The application may include a monitoring and triggering application ("MTA"). The MTA may run an artificial intelligence machine learning ("MTA AI/ML") algorithm to identify the state of stress.

Identifying the state of stress may include analyzing a first data stream feature ("first feature") relating to the agent. The first feature may be measured during a call performed with the agent. The call may be a voice call. The first feature may be associated with a first emotion of the agent. The first feature may register above a first feature threshold. The first feature threshold may correspond to the first feature.

Identifying the state of stress may include analyzing a second data stream feature ("second feature") relating to the agent. The second feature may be measured during a call performed with the agent. The call may be a voice call. The second feature may be associated with a second emotion of the agent. The second feature may register above a second feature threshold. The second feature threshold may correspond to the second feature.

The processor may include a graphics processing unit ("GPU"). The processor may include a central processing unit ("CPU").

The MTA AI/ML algorithm may measure the first feature and the second feature during a call. The MTA AI/ML algorithm may identify if the state of stress of the agent is present during the call in which the first feature and second feature are measured.

The second emotion may be defined as being aligned with the first emotion when the first emotion registers above the first feature threshold and the second emotion, contemporaneous with the first emotion, registers above a second feature threshold. When the second emotion is aligned with the first emotion, the agent may be experiencing a state of stress.

The first feature threshold may be determined before a call. The first feature threshold may be a predetermined first feature threshold.

The second feature threshold may be determined before a call. The second feature threshold may be a predetermined second feature threshold.

When identifying that the agent is in the state of stress, notification may be provided to a supervisor of the agent that the agent may be experiencing stress. The supervisor may be notified that the agent is eligible for a destress break. Approval may be received from the supervisor for the agent to receive the destress break. After the agent completes a call, incoming calls may be routed away from the agent. The destress break may be provided on a desktop computer of the agent. Upon completion of the destress break, incoming calls may be routed to the agent.

The destress break may provide the agent with a video recording, an audio recording, a game, or combination thereof.

The processor may transform a video clip to obtain the first feature. The first feature may include a facial expression feature, a gesture recognition feature, or a combination thereof. The video clip may be taken during a call between the agent and a customer. The processor may transform a speech sample to obtain the second feature. The second feature may include an audio sentiment score feature, a transcript tone score feature, a voice tone score feature, or a combination thereof. The speech sample may be taken during a call between the agent and a customer.

The processor may transform a speech sample to obtain the first feature. The first feature may include an audio sentiment score feature, a transcript tone score feature, a voice tone score feature, or a combination thereof. The speech sample may be taken during a call between the agent and a customer. The processor may transform a video clip to obtain the second feature. The second feature may include a facial expression feature, a gesture recognition feature, or a combination thereof. The video clip may be taken during a call between the agent and a customer.

The second feature may be defined as being contemporaneous with the first feature when the first feature and the second feature have timestamps that are separated by sixty seconds or less from each other. The second feature may be defined as being contemporaneous with the first feature when the first feature and the second feature have timestamps that are separated by fifteen seconds or less from each other.

The method may include not penalizing the agent for having received a destress break.

The destress break may be between one and ten minutes. The destress break may be between two and five minutes.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows an illustrative block diagram in accordance with principles of the disclosure;

FIG. 10B shows an illustrative flowchart in accordance with principles of the disclosure.

DETAILED DESCRIPTION OF THE DISCLOSURE

Figure 1:
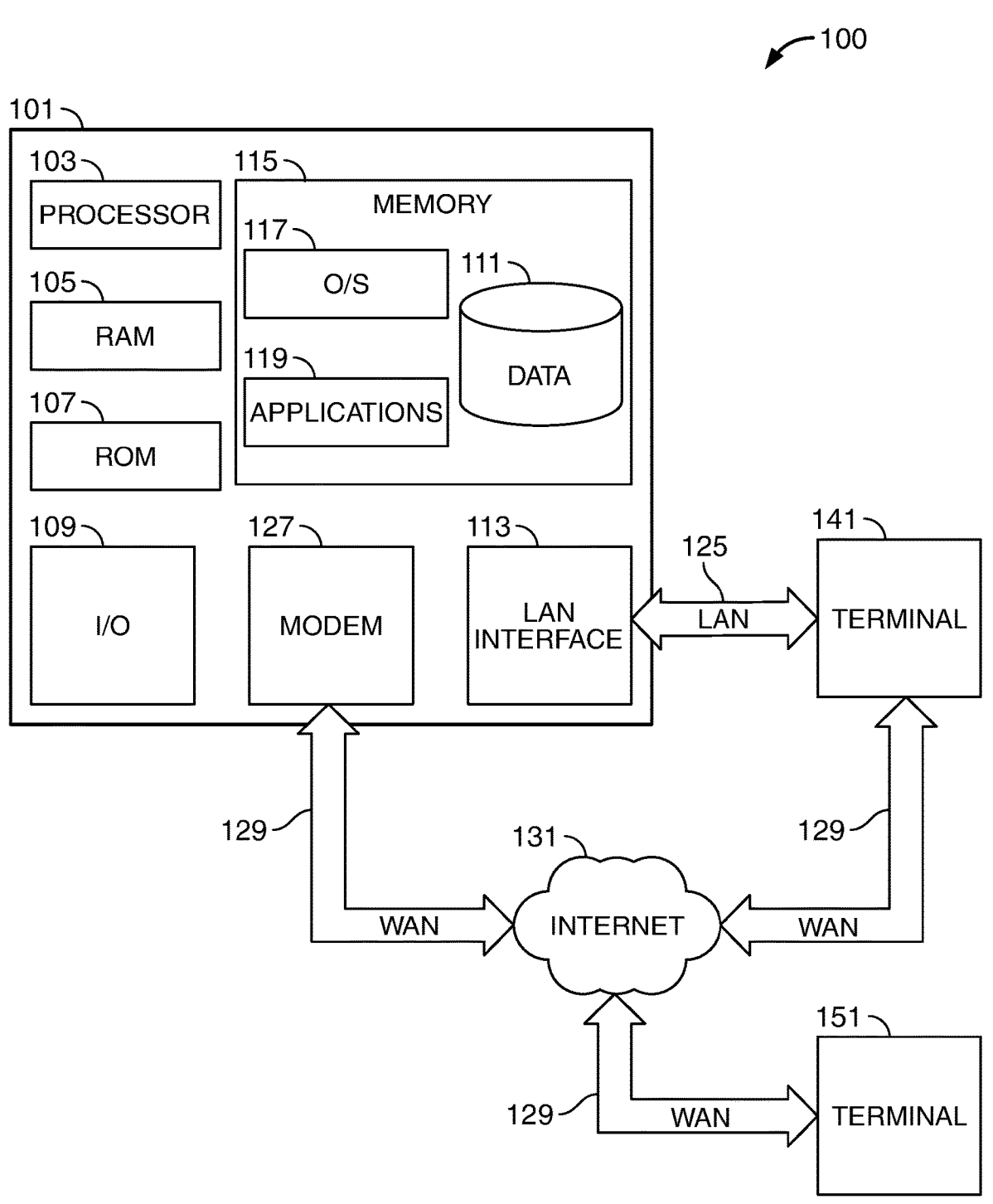
FIG. 1 shows an illustrative block diagram in accordance with principles of the disclosure.

Provided are apparatus and methods for destressing an agent in a contact center of an enterprise. The apparatus may implement the methods.

The apparatus and methods may include building an MTA which may determine a contact center agent's needs based on an MTA AI/ML algorithm. The MTA AI/ML algorithm may propose a destress opportunity to the contact center agent, herein called agent, after considering several factors.

The apparatus and methods may include building the MTA which may determine a call center agent's needs based on the MTA AI/ML algorithm. The MTA AI/ML algorithm may propose a destress opportunity to the call center agent, after considering several factors.

The apparatus and methods may include a call center with a team of agents who answer a large volume of calls coming into an organization and/or going out from the organization. The party outside the organization may include existing customers or potential customers.

The apparatus and methods may include a contact center with a team of agents who answer a large volume of communications coming into an organization or initiate a large volume of communications going out of the organization. The party outside the organization may include existing customers or potential customers. The communications may include phone calls, emails, live chats, social media interactions, and other communication channels.

The apparatus and methods may include inputs into the MTA AI/ML algorithm may include capturing audio and video of the agent, along with other metrices. There are multi-dimensional transformers that may extract various numerical and categorical features, like the tone, sentiment, facial expressions, and number of calls answered, from the input signal applied.

The apparatus and methods may include numerical features and categorical features. Examples of numerical features include sentiment score of calls, tone score from transcript for each emotion selected, tone score from voice analysis, number of calls answered, time since last break, and duration of calls.

Sentiment score of calls may include a result of a sentiment analysis of the transcript of the call. This may tell if a general sentiment of the user is positive, negative, or neutral, and the magnitude to which it is inclined in either direction. This score may be between −1 and 1, with −1 being the most negative sentiment, 1 being the most positive sentiment, and 0 being neutral. A threshold may be employed, for example, an agent sentiment score cannot drop below −0.5.

Tone score from transcripts for each emotion selected may include a result of a tone analysis performed on the transcript of the call. This will tell a score for the agent in the following categories: excited, frustrated, impolite, polite, sympathetic, satisfied, and sad. This score may be between 0 and 1, with 0 meaning that the tone was not expressed and 1 being the maximum expression of the tone. A threshold can be employed, for example, agent politeness score cannot drop below 0.5.

Tone score from voice analysis may include a result of a sentiment analysis performed on the audio of the call. This may tell if the general sentiment of the user is positive, negative, or neutral, and the magnitude to which it is inclined in either direction. This score may be between −1 and 1, with −1 being the most negative sentiment, 1 being the most positive sentiment, and 0 being neutral.

The number of calls answered may include the number of calls the agent answered since the agent's last break.

Time since last break may include the time since the agent last took a break or was last given a destress break by the system. A threshold may be employed, for example, an agent must take a short break every 90 minutes, or an agent cannot be given a short break if less than 60 minutes have passed since the agent's last break.

Duration of calls may include the duration of calls the agent answered since the agent's last break.

Examples of categorical features may include call escalation, facial expression detection, and gesture recognition. Categorical features may include binary decisions.

The presence of call escalation may be measured to include a one-hot encode (binary) to reflect if any calls were escalated (encoded to 1) or not escalated (encoded to 0). Escalation of calls may indicate that the agent has been dealing with more complex and stressful calls Facial expression detection may include the agent's emotional expressions, such as smiling, frowning, yawning, blinking. These emotional expressions may be identified and categorized by emotions like happy, sad, tired, etc. Each emotion may be measured and assigned a one-hot encode (binary) to reflect if a certain emotion was detected (encoded to 1) or not detected (encoded to 0).

Gesture recognition may include the agent's hand gestures. The hand gestures may be identified and categorized by emotions such as happy, sad, tired, etc. Each gesture may be measured and assigned a one-hot encode (binary) to reflect if a certain emotion was detected (encoded to 1) or not detected (encoded to 0).

The apparatus and methods may include a processor. The processor may include multiple transformer units for recognition of several features like sentiment score, tone score, emotion, and expression. There may be separate transformer units to recognize the audio, video, and other inputs. The transformer units may be trained separately for each agent.

When the agent logs into a system such as a server such as a telephony interaction server, trained transformers specific to the agent may get pulled automatically. The output features from these transformers may be weighted as per the priority assigned to those features. For example, tone may be weighed more than the number of calls answered, or vice versa.

The audio and the video transformers may be aligned. The audio and the video transformers may be contemporaneous. The audio and the video transformers may be both contemporaneous and aligned. Alignment between the audio and the video transformers may help by validating the agent status. For example, if the agent is irritated, it may be reflected in the tone as well as facial expression. Over the time of a call and throughout a workday, the features might change for the agent. The timestamp tracker may help keep track of the agent's features throughout the day. If the features go beyond a certain variance, the transformer may be trained for the new and/or updated features. For example, when the agent gains expertise, the average handling time ("AHT") may be less, and the number of calls answered might be more.

Finally, the features may be compared with the preset or real-time set threshold for making a final decision if the agent is eligible for the destress break. The thresholds may be relative for each agent. The thresholds may be equivalent for all agents at a similar experience level. The thresholds may be equivalent for all agents across the enterprise.

The apparatus and methods may include post-processing. There may be several output decisions and corresponding post-processing actions. For example, if the agent is not eligible for destress break, there may be no further action.

If the agent is eligible for a destress break, the agent's supervisor may be notified to accept or decline the issuance of the destress break. If the supervisor declines the notification, no further action may be taken. If the supervisor accepts the notification, the agent may be relieved and gets the destress break. The destress break may be of different durations, such as two-minutes.

If the agent is eligible for the destress break due to exhibiting negative features, then call transfer protocol may be initiated. Exhibiting negative features may include an unpleasant conversation between the caller and the agent, or the agent exhibiting negative, angry, or aggressive dialogue, then the agent may be relieved from the call. The call may be transferred to another agent.

When the call is transferred to another agent, one or more of the following steps may be initiated. The caller context and call updates may be transferred to another agent. The caller, customer, and context data may be saved to avoid similar combination in future. The agent's expertise level may be updated to stop similar expertise calls in future.

The apparatus and methods may include a contemporaneous output function. The contemporaneous output function may indicate whether the audio and the video transformers are contemporaneous and aligned. For example, if the agent is irritated, it may be reflected in the tone and facial expression. If the agent is tired, the agent may yawn frequently.

The video of the agent may be applied to the first transformer to recognize the gestures. The voice of the agent may be applied to the second transformer to recognize the emotions and the sentiments from its transcription. The recognized outputs of both the transformers may be applied to the contemporaneous output function to validate the agent mental status.

The contemporaneous output function may show a measurement relating to the mapping of gestures, emotions, and sentiments. If the mapping is contemporaneous and aligned, then the contemporaneous output function may be 1. If the mapping is not contemporaneous and aligned, then the contemporaneous output function may be 0. The output of the contemporaneous output function may include a contemporaneous and aligned status. The contemporaneous and aligned status may be time stamped and calculated for each call. The contemporaneous and aligned status of 1 may aid in making the decision of destress break for the agent.

The apparatus and methods may compare recognized features with set thresholds for making a final decision. The set thresholds may be predetermined or determined in real-time. The decision may be either that the agent is eligible break or agent is not eligible for break. The MTA AI/ML algorithm may provide the break eligibility status to the supervisor for acceptance or rejection. In some negative situations, like call escalations and negative emotions, the agent may be given a break and relieved from the current call. The call may be transferred to another agent.

The apparatus and methods may include a provision for checking the decisions from the transformers and validating them for facilitating the correct decision. For example, the output from the video and speech samples may be contemporaneous and aligned to determine if a decision from one of the transformers is aligned with the feedback from another transformer. There may also be a provision for training the transformers when the features change beyond a set variance.

The apparatus and methods may address the challenge of deciding if the agent should be given a destress break based upon non-invasive methods. The apparatus and methods may help prevent the agent from reaching a saturation level of stress. The apparatus and methods may keep the agent focused on helping the customers of the organization. The apparatus and methods may take care of the well-being of the agent's mental state and help enhance customer satisfaction.

The apparatus and methods may provide a system that recommends when an agent should receive a destress break. The apparatus and methods may provide a system that recommends content for a destress break such as a video, an audio, or a game. The agent may take the destress break without impacting on the agent's efficiency from a reporting perspective. The MTA AI/ML algorithm in real-time may provide individual transformer results. This MTA AI/ML algorithm may train the transformers again when the parameters register above the threshold. The MTA AI/ML algorithm may validate the transformer results against other transformer results with a similar timestamp using a function that checks for contemporaneousness and alignment.

The apparatus may include a system used to destress the agent in the contact center of an enterprise. The system may be used to provide a destress break to the agent to destress the agent.

The system may include use of a processor configured to run an application to identify the state of the agent. The state of the agent may include a state of stress.

The processor may include a graphics processing unit ("GPU"). The processor may include a central processing unit ("CPU").

The application may include a monitoring and triggering application ("MTA"). The MTA may be configured to run an artificial intelligence machine learning ("MTA AI/ML") algorithm to identify the state of stress. The MTA may run on the processor. The MTA may run on the GPU. The MTA may run on the CPU.

Identification of the state of stress may include an analysis of a first data stream feature ("first feature") relating to the agent. The processor may be configured to measure the first feature during a call with the agent. The call may be a voice call. The first feature may be associated with the first emotion of the agent. The first feature may register above a first feature threshold. The first feature threshold may correspond to the first feature.

Identification of the state of stress may include analysis of a second data stream feature ("second feature") relating to the agent. The processor may be configured to measure the second feature during a call with the agent. The call may be a voice call. The second feature may be associated with a second emotion of the agent. The second feature may register above a second feature threshold. The second feature threshold may correspond to the second feature.

The processor may be configured to run the MTA AI/ML algorithm that may be configured to measure the first feature and the second feature during a call. The MTA AI/ML algorithm may be configured to identify if the state of stress of the agent is present during the call in which the first feature and second feature are measured.

The second emotion may be defined as being aligned with the first emotion if the first emotion registers above the first feature threshold and the second emotion, contemporaneous with the first emotion, registers above a second feature threshold. When the second emotion is aligned with the first emotion, the agent may be experiencing a state of stress. When the second emotion is not aligned with the first emotion, the agent may not be experiencing a state of stress.

The system may include a server for managing the flow of incoming calls to the contact center, such as a telephony interaction server. The system may include a server for providing call statistics about agents, such as a statistics server.

The processor may be configured to determine the first feature threshold before a call. The first feature threshold may be a predetermined the first feature threshold. The processor may run the MTA AI/ML algorithm to predetermine the first feature threshold.

The agent may be in a state of stress when the first emotion registers above the first feature threshold. The agent may not be in a state of stress when the first emotion registers above the first feature threshold.

The processor may be configured to determine the second feature threshold before a call. The second feature threshold may be a predetermined the second feature threshold. The processor may run the MTA AI/ML algorithm to predetermine the second feature threshold.

The agent may be in a state of stress when the second emotion registers above the second feature threshold. The agent may not be in a state of stress when the second emotion registers above the second feature threshold, even if the first emotion registers above the first feature threshold.

When identifying that the agent is in the state of stress, the processor may be configured to do the following steps: provide notification to a supervisor of the agent that the agent may be experiencing stress and is eligible for a destress break; receive approval from the supervisor for the agent to receive the destress break; route calls away from the agent after completing a most recent call; provide the destress break on a desktop computer of the agent; and route calls to the agent upon completion of the destress break.

The destress break may provide the agent with a video recording, an audio recording, a game, or combination thereof.

The processor may transform a video clip to obtain the first feature. The first feature may include a facial expression feature, a gesture recognition feature, or a combination thereof. The video clip may be taken during a call between the agent and a customer. The processor may transform a speech sample to obtain the second feature. The second feature may include an audio sentiment score feature, a transcript tone score feature, a voice tone score feature, or a combination thereof. The speech sample may be taken during a call between the agent and a customer.

The processor may transform a speech sample to obtain the first feature. The first feature may include an audio sentiment score feature, a transcript tone score feature, a voice tone score feature, or a combination thereof. The speech sample may be taken during a call between the agent and a customer. The processor may transform a video clip to obtain the second feature. The second feature may include a facial expression feature, a gesture recognition feature, or a combination thereof. The video clip may be taken during a call between the agent and a customer.

The second feature may be defined as being contemporaneous with the first feature when the first feature and the second feature have timestamps that are separated by sixty seconds or less from each other. The second feature may be defined as being contemporaneous with the first feature when the first feature and the second feature have timestamps that are separated by fifteen seconds or less from each other.

The processor may be configured to not penalize the agent for having received a destress break.

The destress break may be between one and ten minutes. The destress break may be between one and five minutes. The destress break may be between two and three minutes. The destress break may be about two minutes.

When the first feature is a facial expression feature or a gesture recognition feature that registers above the first feature threshold leading to the destress break, the system may be configured to continue to monitor the video clips of the agent. When the destress break is completed, if the facial expression feature or the gesture recognition feature of the agent still registers above the predetermined video threshold, another destress break may be offered to the agent.

The destress break may be provided to the agent without effecting metrics relating to the agent's efficiency from a reporting perspective. The system may include where the agent is kept logged on to the telephony interaction server while the contact center agent receives the destress break. The system may include where the agent is logged off of the telephony interaction server while the contact center agent receives the destress break.

Metrics relating to the agent's efficiency may include one or more of the following that are measured throughout, or at varying times during the agent's workday: the number of breaks taken; the duration of each break; the total duration of the breaks; how many calls were answered; the average length of each call; the average of how many words were need to complete the call; how many calls were elevated to the agent's manager or elsewhere in the contact center; the complexity of the matter handled during the call; time between each of the breaks; among other possible metrics.

Numerical features relating to the agent's efficiency may include one or more of the following that are measured throughout the agent's workday: sentiment score of calls; tone score from the transcript for each call, such as emotional sections of the call; tone score from voice analysis; among other numerical features. Numerical features may include value along a spectrum. Numerical features may include binary values.

Categorical features relating to the agent's efficiency may include one or more of the following that are measured throughout the agent's workday: call escalation; facial expression emotion; gesture recognition; among other categorical features. Categorical features may include binary values. Categorical features may include a value along a spectrum.

The destress break may be provided to the agent without affecting the agent's efficiency from a reporting perspective including not effecting metrics, numerical features, and/or categorical features relating to the agent. This may be accomplished by keeping the agent logged on to the telephony interaction server while receiving the destress break. This may be accomplished by logging off the agent from the telephony interaction server while the receiving the destress break.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit ("CPU"), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as graphics processing unit ("GPU"), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/ output module may also include one or more speakers for providing audio output and a video display device for providing textual, audio, audiovisual, and/or graphical output. The input and output may be related to computer application functionality.

System 100 may be connected to other systems via a local area network interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network ("LAN") 125 and a wide area network ("WAN") 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement data types. The invention may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. Differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
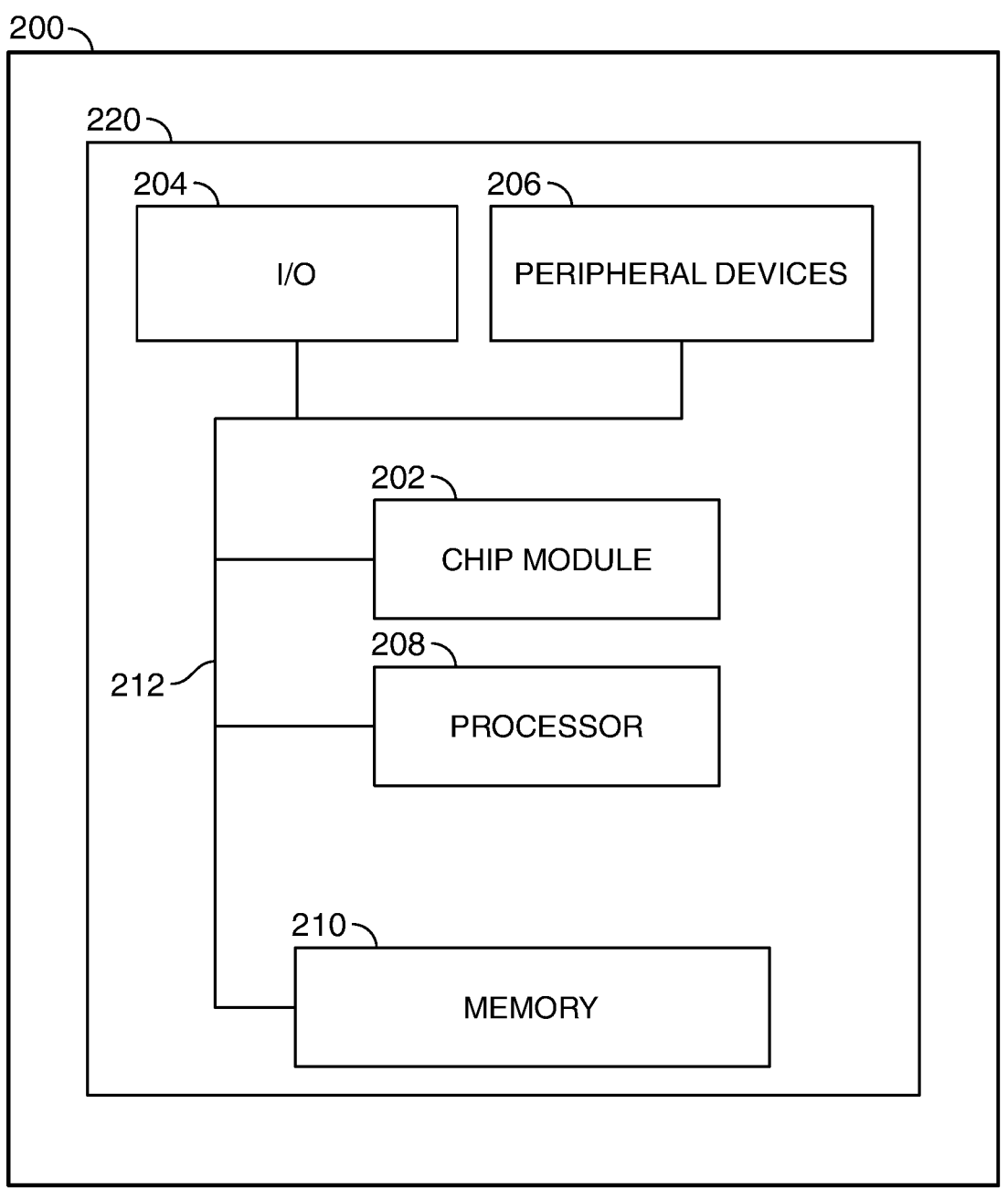
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, that may include one or more integrated circuits, and that may include logic configured to perform any other suitable logical operations.

Apparatus 200 may include one or more of the following components: I/O circuitry 204, that may include a transmitter device and a receiver device and may interface with fiber optic cable, coaxial cable, telephone lines, wireless devices, PHY layer hardware, a keypad/display control device or any other suitable media or devices; peripheral devices 206, that may include counter timers, real-time timers, power-on reset generators or any other suitable peripheral devices; logical processing device 208, that may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119 (shown in FIG. 1), signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
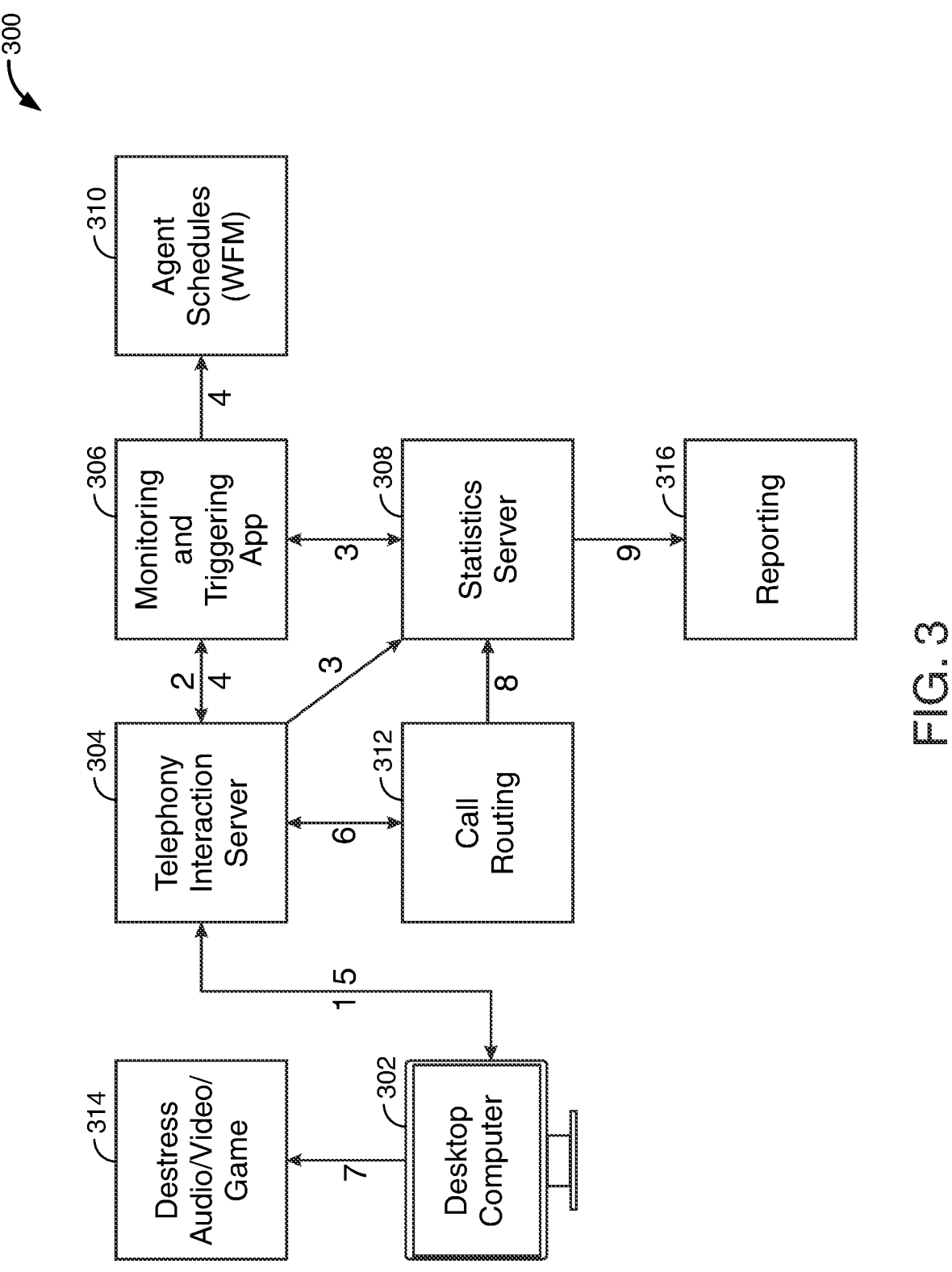
FIG. 3 shows an illustrative block diagram in accordance with principles of the disclosure.

FIG. 3 shows illustrative diagram 300. Illustrative diagram 300 may show a contact center agent destress mode utilizing a monitoring and triggering application ("MTA").

The contact center agent ("agent") may login by using desktop computer 302. The agent may log into telephony interaction server 304 via desktop computer 302. Telephony interaction server 304 may provide work items to desktop computer 302 such as incoming calls from customers. After the login event, notification may be provided to MTA 306. MTA 306 may subscribe to statistics server 308 for statistics regarding the agent and the latter's performance at the contact center. MTA 306 may train and run the MTA AI/ML algorithm to determine the agent's level of stress. If MTA AI/ML algorithm logic determines a destress work item, also referred to as a destress break, is warranted for the agent, MTA 306 may seek approval from the agent's manager. When receiving approval, MTA 306 may contact agent scheduling workforce management ("WFM") tool 310 to inform the latter that a destress work item is being provided to the agent. This step may avoid penalizing the contact agent for time spent on the destress work item, since the agent may not receive work items such as incoming calls during the destress work item.

MTA 306 may send a destress work item specific for the agent to telephony interaction server 304. Telephony interaction server 304 may communicate with the agent via the desktop computer 302 to inform the agent of the approval of the destress work item. The agent may have an opportunity to approve or deny the destress work item.

When receiving approval from the agent, call routing 312 blocks the agent from receiving other interactions and, once the existing call ends, routes the destress work item. Desktop computer 302 may then receive and play destress audio, destress video, or destress game 314. Desktop computer 302 may include a business user interface component. The destress work item may contain a URL that provides desktop computer 302 with access to the destress work item. The destress work item may be provided to the agent's soft phone.

Call routing 312 may contact statistics server 308 to update the latter about the destress work item. Statistics server 308 may contact reporting 316 to inform the latter about the agent's destress work item.

Once completing the destress work item, MTA 306 may instruct telephony interaction server 304 to provide desktop computer 302 with work items including calls.

Aspects of MTA 306 may include integrated reporting, blended routing, and full automation such that the agent may not need to change states throughout the day. MTA 306 may ensure that the outbound predictive pace is preserved.

Figure 4:
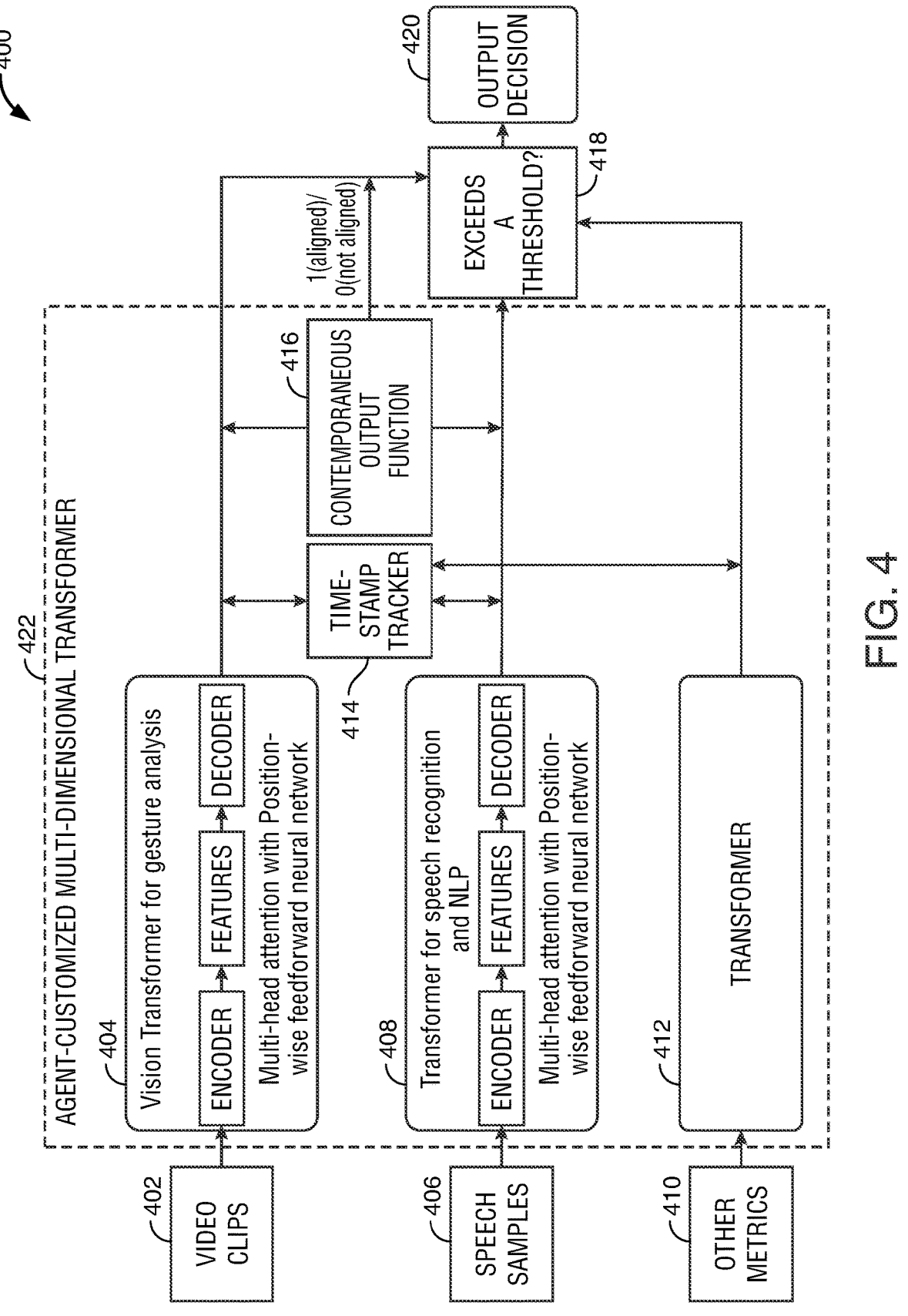
FIG. 4 shows an illustrative block diagram in accordance with principles of the disclosure.

FIG. 4 shows illustrative diagram 400. Illustrative diagram 400 may show agent-customized multi-dimensional transformer 422 for an agent. A processor may run agent-customized multi-dimensional transformer 422. The processor may include a GPU. The processor may include a CPU.

Video clips 402 may be taken from an agent's call. The MTA may receive video clips 402. The processor running the MTA may run vision transformer for gesture analysis 404. Vision transformer for gesture analysis 404 may receive video clips 402 and process them as part of the MTA AI/ML algorithm to determine when the agent may need a destress break.

Vision transformer for gesture analysis 404 may include an encoder, a features identifier, and a decoder. Vision transformer for gesture analysis 404 may form a multi-head attention ("MHA") with position-wise feedforward neural network ("FNN"). MHA may be a variant of machine learning-based attention. The latter may be a mechanism that intuitively mimics cognitive attention. The FNN may be a type of artificial neural network. The flow of information between layers in the FNN may be by uni-directional flow. This means that the information flows only in one direction, in a forward direction, from the input nodes, through the hidden nodes and to the output nodes, without any cycles or loops.

Use of vision transformer for gesture analysis 404 may lead to determining when video features register above a predetermined threshold indicating the agent is experiencing stress.

Speech samples 406 may be taken from an agent's call. The MTA may receive speech samples 406. The processor running the MTA may run transformer for speech recognition and nature language processing ("NLP") 408. Transformer for speech recognition and NLP 408 may receive speech samples 406 and process them as part of an MTA AI/ML algorithm to determine when the agent may need a destress break.

Transformer for speech recognition and NLP 408 may include an encoder, a features identifier, and a decoder. Transformer for speech recognition and NLP 408 may form an MHA with position-wise FNN. Transformer for speech recognition and NLP 408 may be used to determine when speech features register above a predetermined threshold indicating the agent is experiencing stress. Speech features may include sentiment score of a call feature, a tone score from a call transcript feature, and a tone score from a voice analysis feature.

The agent's performance over a series of work items such as answering incoming calls may provide other metrics 410. These metrics may include the number of calls answered, time since last break, duration of calls, escalation of calls, direct feedback from customer, AHT, number of utterances by agent for solving a use case, among other metrics. The processor running the MTA may process these metrics by running transformer 412.

Timestamp tracker 414 may provide a time stamp for features of vision transformer for gesture analysis 404, for features of transformer speech recognition and NLP 408, and for metrics of transformer 412. The processor running the MTA may run timestamp tracker 414. The timestamp tracker checks the variance between the current and the previous outputs for training purposes.

Contemporaneous output function 416 may provide a tool for validating outputs from vision transformer multi-dimensional transformer 404 and transformer for speech recognition and NLP 408. The processor running the MTA may run contemporaneous output function 416. The outputs of each may indicate alignment of measurements of an emotional state of the agent. When one of the features indicates the agent may have an emotional state of stress, contemporaneous output function 416 may validate that other features support the assessment of stress. When the features are aligned, the output may be considered as contemporaneous and aligned.

The processor running the MTA may determine if any of the transformed measurements exceeds a threshold 418 set for that measurement. The threshold may be a predetermined threshold. The threshold may be a threshold determined in real-time. The threshold may be unique for a specific feature or metric.

When features register above a threshold, output decision 420 may be to offer a destress break. When features register above a threshold and are contemporaneous and aligned, output decision 420 may be to offer a destress break. A supervisor of the agent may receive output decision 420 and decide whether to offer a destress break to the agent.

FIG. 5 may show an illustrative flow diagram. FIG. 5 shows an illustrative diagram 500 of the contemporaneous output function. Illustrative diagram 500 may show a flow diagram for the contemporaneous output function.

Table 501 may illustrate a table describing the determination of contemporaneousness and alignment. Expressions and gestures may be detected, for example, from video clips. The expressions and gestures may be analyzed to determine a sentiment. For example, an expression of smiling may result in a sentiment detection score of 1 indicating a positive sentiment. An expression of yawning may result in a sentiment detection score of −1 indicating a negative sentiment.

Emotion and its score may be detected, for example, from video clips and/or speech samples. For example, measurements of politeness in the agent's speech may have a score of 0.8. Frustration in the agent's speech may have a score of 0.4. Excitement in the agent's speech may have a score of 0.9.

A contemporaneous and aligned output may be 1 when the sentiment score is 1 and the emotion and its score is greater than 0.5, or when the sentiment score is −1 and the emotion and its score is 0.5 or less.

The contemporaneous and aligned output may be 0 when the sentiment score is 1 and the emotion and its score is 0.5 or less, or when the sentiment score is −1 and the emotion and its score is greater than 0.

Figure 6:
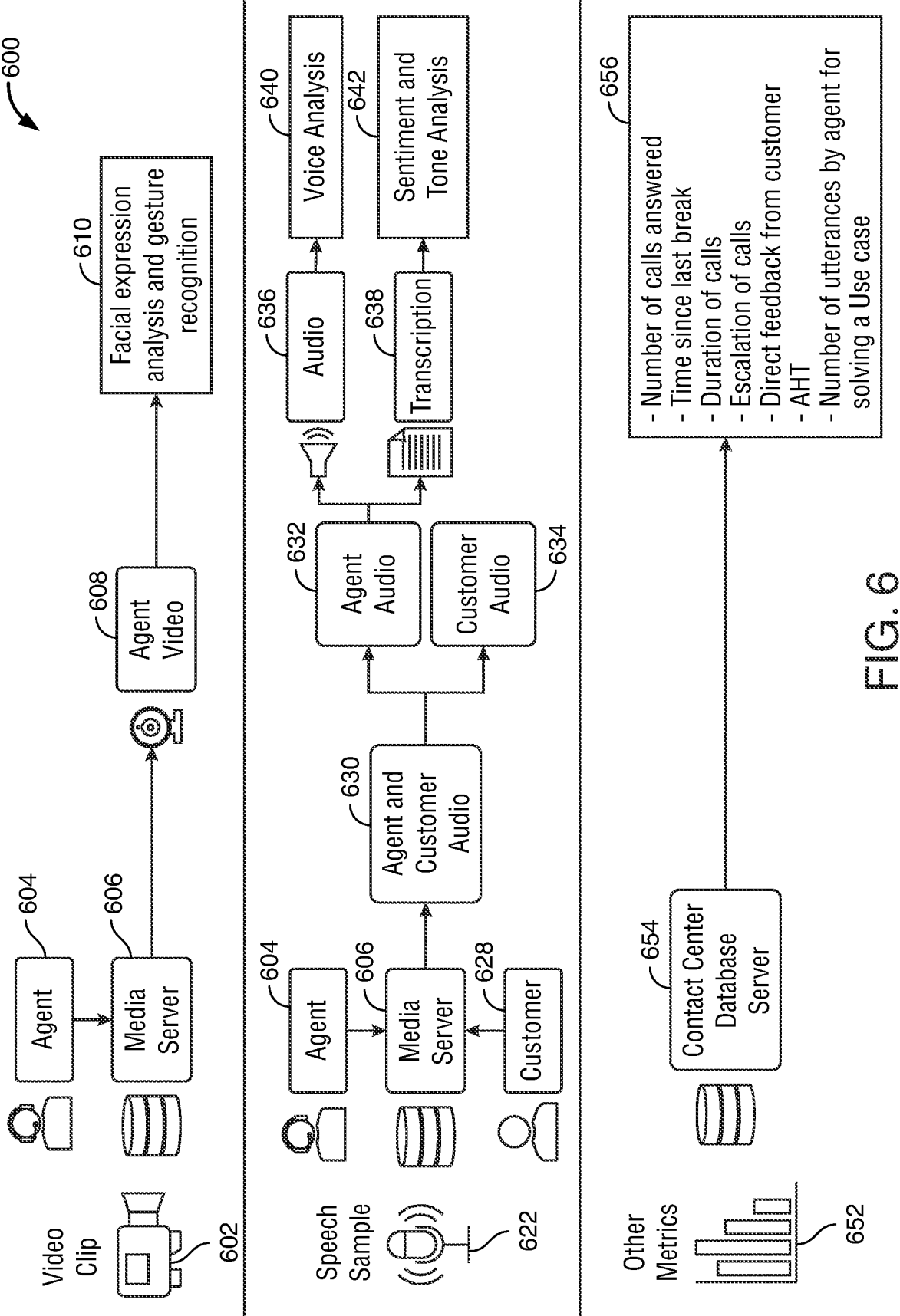
FIG. 6 shows an illustrative block diagram in accordance with principles of the disclosure.

FIG. 6 shows illustrative diagram 600. Illustrative diagram 600 may show a flow diagram for input extraction of video clips.

Video capture 602 shows the steps for analyzing an agent's video. A video of agent 604 may be captured during a call and stored on media server 606. A processor may run an MTA AI/ML algorithm to extract relevant data from stored agent video 608. Output of the MTA AI/ML algorithm may include facial expression analysis and gesture recognition.

Voice capture 622 shows the steps for analyzing an agent's conversation. An audio of agent 604 and customer 628 may be captured during a call and stored on media server 606. For example, audio may be acquired as a WAV or MP3 file. The processor may run an MTA AI/ML algorithm to extract relevant data from stored agent and customer audio 630 such as by pre-processing the audio data to clean it and remove noise.

The processor may run an MTA AI/ML algorithm to segment the audio data by speaker diarization to determine when different speakers are speaking. Diarization may enable clustering agent audio 632 and customer audio 634, focusing on the former and ignoring the latter. The processor may run an MTA AI/ML algorithm may segment agent audio 632 further between audio 636 and transcription 638. Transcription 638 may be accomplished by a speech recognition engine that converts the audio to text.

The output of the MTA AI/ML algorithm for audio 636 may include voice analysis 640. The output of the MTA AI/ML algorithm for transcription 638 may include sentiment and tone analysis 642.

Other metrics capture 652 shows the steps for analyzing other metrics relating to the agent the call. The other metrics may be captured and stored on contact center database ("DB") server 654. The processor may run an MTA AI/ML algorithm to extract relevant features based on call data since the agent's last reported break. Output of the MTA AI/ML algorithm may analyze the other metric data for number of calls answered, time since last break, duration of calls, escalation of calls, direct feedback from customer, AHT, and number of utterances by agent for solving a use case.

Figure 7:
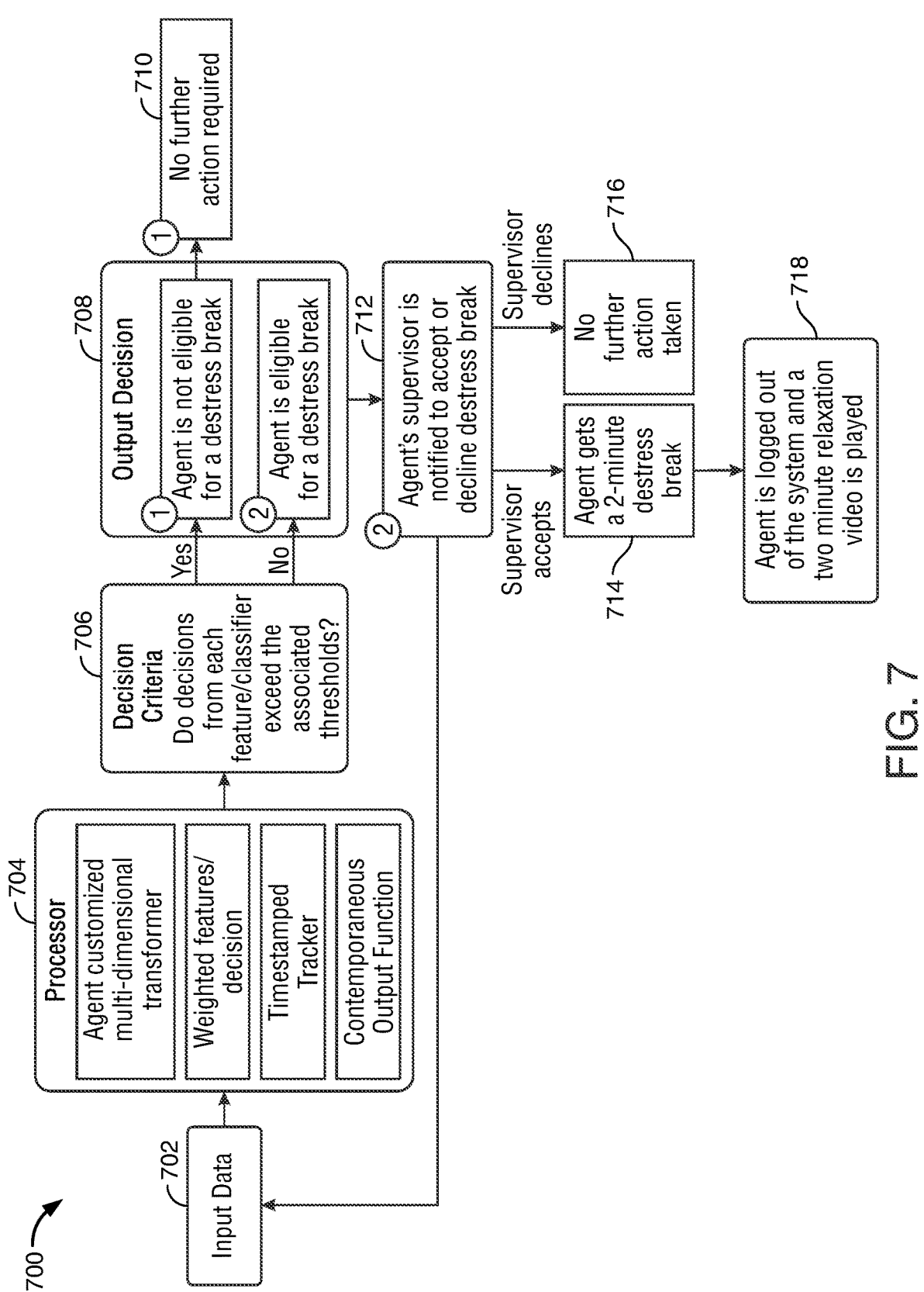
FIG. 7 shows an illustrative block diagram in accordance with principles of the disclosure.

FIG. 7 shows illustrative diagram 700. Illustrative diagram 700 may show an MTA flow diagram such as processing, output, and post-processing.

Input data 702, such as captured video, captured audio, and other metrics, may be inputted into a processor 704. Processor 704 may also include an agent-customized multidimensional transformer. Processor 704 may run the MTA AI/ML algorithm to run the transformers. Processor 704 may include weighted features which may be the output of transformers. Processor 704 may include weighted decisions which may give more weight to one feature than another. Some features may be more revealing of an agent's stress level than other features, and this may vary from agent to agent. Weighting decisions may allow for customizing the MTA AI/ML algorithm to from agent to agent.

Processor 704 may timestamp input data 702. Processor 704 may use a contemporaneous output function to determine if the input data 702 is contemporaneous and aligned. Contemporaneousness and alignment of input data 702 may allow determination of a need for a destress break of an agent. Contemporaneousness and alignment indicating a need for a destress break may exist when multiple features of input data 702 with a similar timestamp show that the agent is stressed.

Decision criteria 706 may use processor 704 to run the MTA AI/ML algorithm to determine if decisions from each feature and/or classifier register above their associate threshold. When the feature and/or classifier register above its associated threshold, then output decision 708 may be that the agent is not eligible for a destress break. When a destress break is not indicated, no further action may be required 710.

When the feature and/or classifier does not register above its associated threshold, then output decision 708 may be that the agent is eligible for a destress break. When a destress is indicated, the agent's supervisor may be notified to accept or decline the destress break 712. When the supervisor declines, no further action may be taken 716.

When the supervisor accepts, the agent may proceed to get a two-minute destress break 714. The agent may be logged out of the system and have a two-minute relaxation video played 718. When completing the relaxation video, the agent may be logged back into the system.

There may be a feedback loop going from 712 to 702. The feedback loop may help the model distinguish between what is considered an appropriate destress break and what is not in each agent-supervisor relationship.

Figure 8:
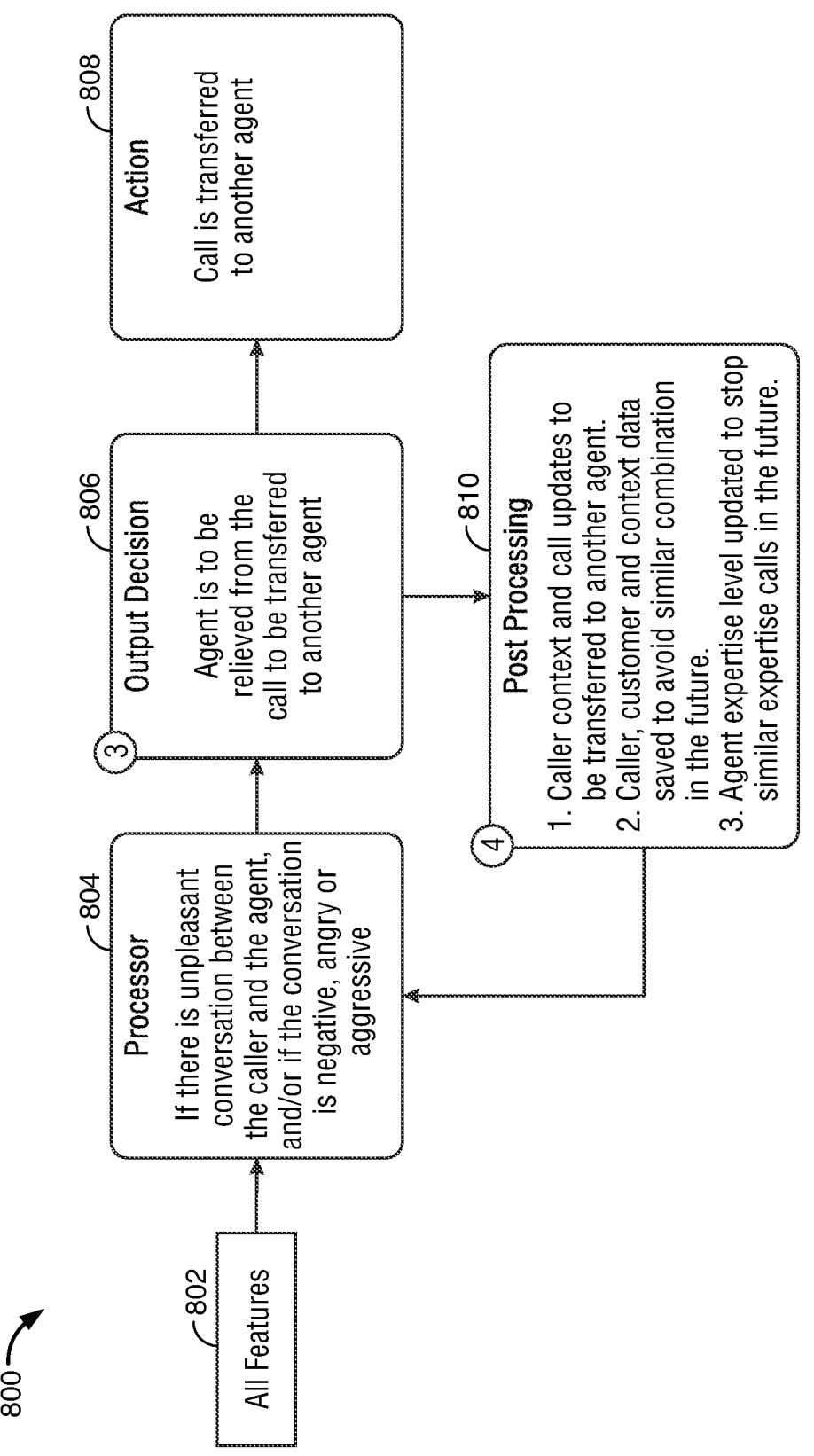
FIG. 8 shows an illustrative block diagram in accordance with principles of the disclosure.

FIG. 8 may show an illustrative flow diagram. FIG. 8 shows an illustrative diagram 800. Illustrative diagram 800 may show a flow diagram for the MTA flow diagram for post-processing.

All features 802 may include a video clip, a speech sample, and other metrics. Processor 804 may detect an unpleasant conversation between the caller and the agent. Processor 804 may detect a negative, angry, or aggressive.

Output decision 806 may determine in an instance where processor 804 detects any of the aforementioned to relieve the agent from the call. Action 808 may entail transferring the call to another agent.

Post-processing 810 may include transferring the caller context and call updates to another agent. Post-processing 810 may include saving the caller, customer, and context data to avoid a similar combination in future. Post-processing 810 may include updating agent expertise level to stop similar expertise calls in future.

Figure 9:
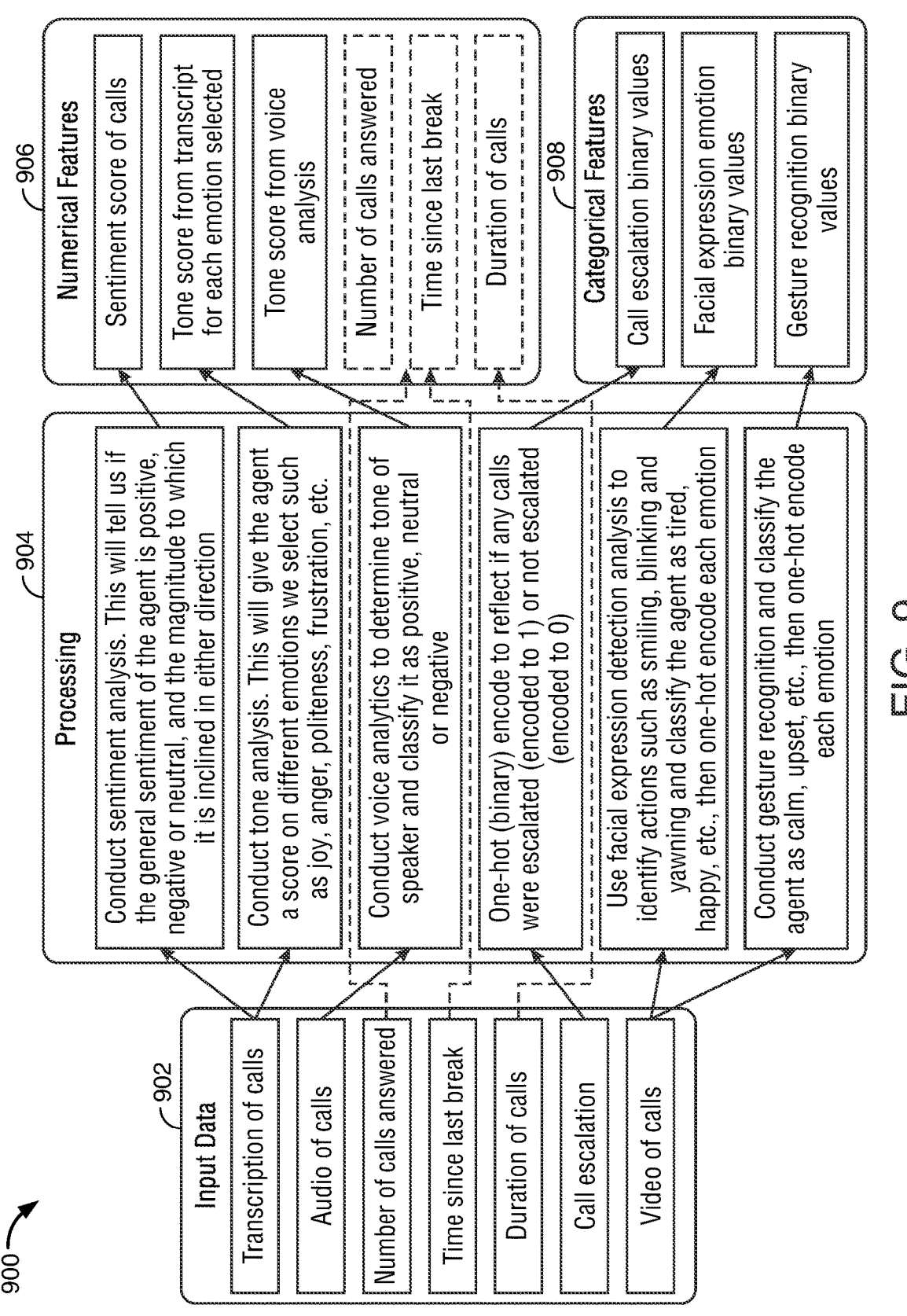
FIG. 9 shows an illustrative block diagram in accordance with principles of the disclosure.

FIG. 9 shows illustrative diagram 900. Illustrative diagram 900 may show a flow diagram for the MTA flow diagram for post-processing. Input data 902 may include a transcription of calls, an audio of calls, a number of calls answered, time since a last break, duration of calls, call escalation, and video of calls.

Processing 904 may illustrate how a processor handles input data 902. Numerical features 906 and categorical features 908 may illustrate how the input data 902 and results of processing 904 are used to obtain features.

For example, the transcript of calls may be used to conduct sentiment analysis. Sentiment analysis may reveal if the general sentiment of the agent is positive, negative, or neutral, and the magnitude to which it is inclined in either direction. These may feed into generating a sentiment score of calls.

Transcription of call may also be used to conduct tone analysis. Tone analysis may give the agent a score on different emotions we select such as joy, anger, politeness, frustration, etc. These may feed into generating a tone score from the transcript for each emotion selected.

Speech samples of calls may be used to conduct voice analytics to determine a tone of speaker and classify it as positive, neutral, or negative. These may contribute to a tone score from voice analysis.

The inputs of number of calls answered, time since last break, and duration of calls may be carried over directly as features bearing the same information.

The input of call escalation may be processed as a one-hot (binary) encode to reflect if any calls were escalated (encoded to 1) or not escalated (encoded to 0). These may lead to the feature of a call escalation binary value.

The input of video of the calls may be processed to use facial expression detection analysis to identify actions such as smiling, blinking, and yawning, and classify the agent as tired, happy, etc. A one-hot code may encode each emotion. This may lead to facial expression emotion binary values.

The input of video of the calls may be processed to conduct gesture recognition and classify the agent as calm, upset, etc. A one-hot code may encode each emotion. This may lead to gesture recognition of binary values.

Figure 10A:
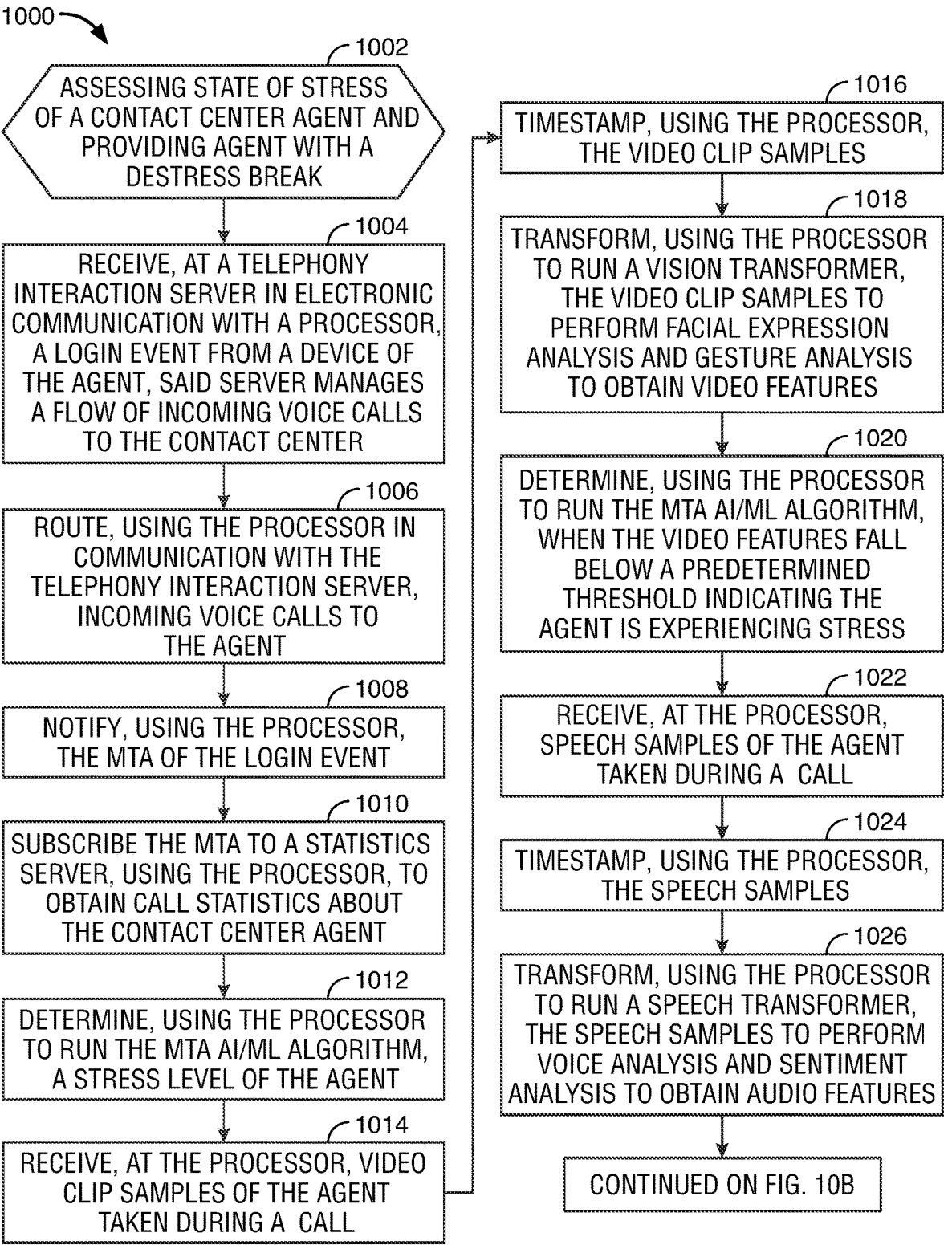
FIG. 10A shows an illustrative flowchart in accordance with principles of the disclosure.

FIG. 10A shows illustrative flowchart 1000, beginning at step 1002, that may provide for assessment of an emotional state of a contact center agent and may provide the agent with a destress break when necessary.

At step 1004, the telephony interaction server that is in electronic communication with a processor associated with the enterprise may receive a login event from a device of the agent. The telephony interaction server may manage a flow of incoming calls to the contact center.

At step 1006, the processor in communication with the telephony interaction server may route incoming calls to the agent.

At step 1008, the processor may notify the MTA of the login event.

At step 1010, the processor may subscribe to a statistics server. The statistics server may provide call statistics about the contact center agent to the MTA.

At step 1012, the processor in electronic communication with the processor may use the MTA AI/ML to determine the stress level of the agent.

At step 1014, the processor may receive video clips of the agent taken during the call.

At step 1016, the processor may timestamp the video clips.

At step 1018, the processor may run a vision transformer to transform the video clips to perform facial expression analysis and gesture analysis to obtain video features. Running the vision transformer may obtain video features such as a facial expression emotion value feature and a gesture recognition value feature.

At step 1020, the processor may run the MTA AI/ML algorithm to determine when the video features register above a predetermined threshold that may indicate the agent is experiencing stress. Each video feature may have its own predetermined threshold.

At step 1022, the processor may receive speech samples of the agent during the call.

At step 1024, the processor may timestamp the speech samples.

At step 1026, the processor may run a speech transformer to transform the speech samples to perform voice analysis and sentiment analysis to obtain audio features. Running the speech transformer may obtain audio features such as a tone score from a call transcript feature and a tone score from a voice analysis feature.

The method continues to FIG. 10B. The method, in FIG. 10B, may continue with step 1028.

At step 1028, the processor may run the MTA AI/ML algorithm to determine when the audio features register above a predetermined threshold that may indicate the agent is experiencing stress. Each audio feature may have its own predetermined threshold.

At step 1030, the processor that is in electronic communication with the processor may provide, when the video features, the audio features, or both register above their predetermined threshold, notification to a supervisor of the agent that the latter is eligible for a destress break to reduce the agent's stress level.

At step 1032, the processor may receive an approval from the supervisor for the agent to receive the destress break.

At step 1034, the processor may route incoming calls away from the agent once the agent completes their current call.

At step 1036, the processor may provide the destress break on the device of agent.

At step 1038, the processor may route incoming calls to the agent when the agent completes the destress break. The processor may provide the destress break to the agent without effecting metrics relating to the agent's efficiency from a reporting perspective.

At step 1040, the method may stop.

Thus, provided may be systems and methods relating to the MTA AI/ML for destressing a contact center agent. Persons skilled in the art will appreciate that the present invention can be practiced by other than the described embodiments, which are presented for purposes of illustration rather than of limitation. The present invention is limited only by the claims that follow.

What is claimed is:

1. A system for destressing an agent in a contact center of an enterprise, the system comprising:
   a processor that is configured to run an application to identify a state of the agent, said state comprising a state of stress;
   wherein:
   the application is a monitoring and triggering application ("MTA");
   the MTA is configured to run an artificial intelligence machine learning ("MTA AI/ML") algorithm to identify the state of stress, said MTA AI/ML algorithm comprising:
   multidimensional transformers that extract numerical features:
      from a video clip to obtain a first data stream feature ("first feature") comprising a facial expression feature, a gesture recognition feature, or a combination thereof; and
      from a speech sample to obtain a second data stream feature ("second feature") comprising an audio sentiment score feature, a transcript tone score feature, a voice tone score feature, or a combination thereof;
   transformer units trained separately for the agent;
   weighted decision functions that give differential weight to the first feature and the second feature; and
   a contemporaneous output function that validates alignment of the first feature and the second feature using timestamp tracking;
   wherein:
      the first feature has a first emotion of the agent that registers above a first feature threshold, said first feature threshold corresponding to the first feature;
      the second feature that is contemporaneous with the first feature has a second feature emotion of the agent that is aligned with the first emotion of the agent;
      the second feature is defined as being contemporaneous with the first feature when the first feature and the second feature have timestamps that are separated by sixty seconds or less from each other;
      the MTA subscribes to a statistics server for agent performance data;
      upon identifying the state of stress, the MTA contacts an agent scheduling workforce management (WFM) tool to coordinate provision of a destress break to avoid efficiency metric penalties for the agent; and
      the MTA communicates with a telephony interaction server to route incoming calls away from the agent and to provide the destress break on a desktop computer of the agent.

2. The system of claim 1 wherein the processor is a graphics processing unit ("GPU").

3. The system of claim 1 wherein the MTA AI/ML algorithm is configured to:
   measure the first feature and the second feature during a call; and
   identify the state of stress of the agent during the call.

4. The system of claim 1 wherein the second emotion is defined as being aligned with the first emotion if the first emotion registers above the first feature threshold and the second emotion:
   is contemporaneous with the first emotion; and
   registers above a second feature threshold.

5. The system of claim 4 wherein:

the first feature threshold is determined before a call; and the second feature threshold is determined before the call.

6. The system of claim 1 wherein the processor is configured to, after identifying that the agent is in the state of stress:

provide notification to a supervisor of the agent that the agent is eligible for a destress break;

receive an approval from the supervisor for the agent to receive the destress break;

after the agent completes a call, route incoming calls away from the agent;

provide on a desktop computer of the agent the destress break, said destress break comprises providing the agent with a video recording, an audio recording, a game, or combination thereof; and, upon completion of the destress break, route incoming calls to the agent.

7. The system of claim 1 wherein the processor is configured to transform:

a video clip to obtain the first feature, said first feature comprising a facial expression feature, a gesture recognition feature, or a combination thereof; and a speech sample to obtain the second feature, said second feature comprises an audio sentiment score feature, a transcript tone score feature, a voice tone score feature, or a combination thereof.

8. The system of claim 1 wherein the processor is configured to transform:

a speech sample to obtain the second feature, said second feature comprises an audio sentiment score feature, a transcript tone score feature, a voice tone score feature, or a combination thereof; and a video clip to obtain the first feature, said first feature comprising a facial expression feature, a gesture recognition feature, or a combination thereof.

9. The system of claim 1 wherein the second feature is defined as being contemporaneous with the first feature when the first feature and the second feature have timestamps that are separated by sixty seconds or less from each other.

10. A method for destressing an agent in a contact center of an enterprise, the method comprising:

running, using a processor, an application to identify a state of the agent, said state comprising a state of stress;

wherein:

the application is a monitoring and triggering application ("MTA");

the MTA runs an artificial intelligence machine learning ("MTA AI/ML") algorithm to identify the state of stress, said MTA AI/ML algorithm comprising:

multidimensional transformers that extract numerical features:

from a video clip to obtain a first data stream feature ("first feature") comprising a facial expression feature, a gesture recognition feature, or a combination thereof, and from a speech sample to obtain a second data stream feature ("second feature") comprising an audio sentiment score feature, a transcript tone score feature, a voice tone score feature, or a combination thereof;

transformer units trained separately for the agent;

weighted decision functions that give differential weight to the first feature and the second feature; and a contemporaneous output function that validates alignment of the first feature and the second feature using timestamp tracking;

wherein:

the first feature has a first emotion of the agent that registers above a first feature threshold, said first feature threshold corresponding to the first feature;

the second feature that is contemporaneous with the first feature has a second emotion of the agent that is aligned with the first emotion of the agent;

the second feature is defined as being contemporaneous with the first feature when the first feature and the second feature have timestamps that are separated by sixty seconds or less from each other;

the MTA subscribes to a statistics server for agent performance data;

upon identifying the state of stress, the MTA contacts an agent scheduling workforce management (WFM) tool to coordinate provision of a destress break to avoid efficiency metric penalties for the agent; and the MTA communicates with a telephony interaction server to route incoming calls away from the agent and to provide the destress break on a desktop computer of the agent.

11. The method of claim 10 wherein the processor is a graphics processing unit ("GPU").

12. The method of claim 10 wherein:

the MTA AI/ML algorithm measures the first feature and the second feature during a call; and the MTA AI/ML algorithm identifies the state of stress of the agent during the call.

13. The method of claim 10 wherein:

the second emotion is defined as being aligned with the first emotion when the first emotion registers above the first feature threshold and the second emotion, contemporaneous with the first emotion, registers above a second feature threshold;

the first feature threshold is determined before a call;

the second feature threshold is determined before the call; and the second feature is defined as being contemporaneous with the first feature when the first feature and the second feature have timestamps that are separated by sixty seconds or less from each other.

14. The method of claim 10 further comprising, after identifying that the agent is in the state of stress:

providing, using the processor, notification to a supervisor of the agent that the agent is eligible for a destress break;

receiving, using the processor, an approval from the supervisor for the agent to receive the destress break;

after the agent completes a call, routing, using the processor, incoming calls away from the agent;

providing, using the processor, on a desktop computer of the agent the destress break, said destress break comprises providing the agent with a video recording, an audio recording, a game, or combination thereof; and upon completion of the destress break, routing, using the processor, incoming calls to the agent.

15. The method of claim 10 wherein the processor transforms:

a video clip to obtain the first feature, said first feature comprising a facial expression feature, a gesture recognition feature, or a combination thereof; and a speech sample to obtain the second feature, said second feature comprises an audio sentiment score feature, a transcript tone score feature, a voice tone score feature, or a combination thereof.

16. The method of claim 10 wherein the processor transforms:

a speech sample to obtain the second feature, said second feature comprises an audio sentiment score feature, a transcript tone score feature, a voice tone score feature, or a combination thereof; and a video clip to obtain the first feature, said first feature comprising a facial expression feature, a gesture recognition feature, or a combination thereof.

17. A non-transitory computer-readable medium storing instructions readable by a processor for destressing an agent in a contract center of an enterprise, the instructions causing the processor to perform processes comprising:

running, using the processor, an application to identify a state of the agent, said state comprising a state of stress; wherein:

the application is a monitoring and triggering application ("MTA");

the MTA runs an artificial intelligence machine learning ("MTA AI/ML") algorithm to identify the state of stress, said MTA AI/ML algorithm comprising:

multidimensional transformers that extract numerical features:

from a video clip to obtain a first data stream feature ("first feature") comprising a facial expression feature, a gesture recognition feature, or a combination thereof, and;

from a speech sample to obtain a second data stream feature ("second feature") comprising an audio sentiment score feature, a transcript tone score feature, a voice tone score feature, or a combination thereof;

transformer units trained separately for the agent; weighted decision functions that give differential weight to the first feature and the second feature; and a contemporaneous output function that validates alignment of the first feature and the second feature using timestamp tracking;

wherein:

the first feature has a first emotion of the agent that registers above a first feature threshold, said first feature threshold corresponding to the first feature;

the second feature that is contemporaneous with the first feature has a second emotion of the agent that is aligned with the first emotion of the agent:

the second emotion is aligned with the first emotion when the first emotion registers above the first feature threshold and the second emotion, contemporaneous with the first emotion, registers above a second feature threshold;

the first feature threshold is determined before a call;

the second feature threshold is determined before the call;

the second feature is defined as being contemporaneous with the first feature when the first feature and the second feature have timestamps that are separated by sixty seconds or less from each other;

the MTA AI/ML algorithm measures the first feature and the second feature during the call;

the MTA AI/ML algorithm identifies the state of stress of the agent during the call;

the MTA subscribes to a statistics server for agent performance data; when identifying that the agent is in the state of stress:

providing, using the processor, notification to a supervisor of the agent that the agent is eligible for a destress break;

receiving, using the processor, an approval from the supervisor for the agent to receive the destress break;

contacting, using the processor, an agent scheduling workforce management (WFM) tool to coordinate provision of the destress break to avoid efficiency metric penalties for the agent;

after the agent completes the call, communicating, using the processor, with a telephony interaction server to route incoming calls away from the agent;

providing, using the processor, on a desktop computer of the agent the destress break; and upon completion of the destress break, communicating, using the processor, with the telephony interaction server to route incoming calls to the agent.

18. The non-transitory computer-readable medium of claim 17 wherein:

the processor is a graphics processing unit ("GPU");

the destress break comprises providing the agent with a video recording, an audio recording, a game, or combination thereof; and the second feature is defined as being contemporaneous with the first feature when the first feature and the second feature have timestamps that are separated by sixty seconds or less from each other.

19. The non-transitory computer-readable medium of claim 17 wherein the processor is configured to transform:

a video clip to obtain the first feature, said first feature comprising a facial expression feature, a gesture recognition feature, or a combination thereof; and a speech sample to obtain the second feature, said second feature comprises an audio sentiment score feature, a transcript tone score feature, a voice tone score feature, or a combination thereof.

20. The non-transitory computer-readable medium of claim 17 wherein the processor is configured to transform:

a speech sample to obtain the second feature, said second feature comprises an audio sentiment score feature, a transcript tone score feature, a voice tone score feature, or a combination thereof; and a video clip to obtain the first feature, said first feature comprising a facial expression feature, a gesture recognition feature, or a combination thereof.

* * * * *